June 5, 1928.
J. L. CREVELING
LUBRICATING MEANS
Original Filed Oct. 11, 1920
1,672,602
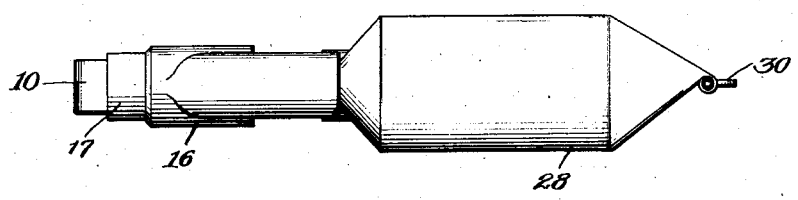
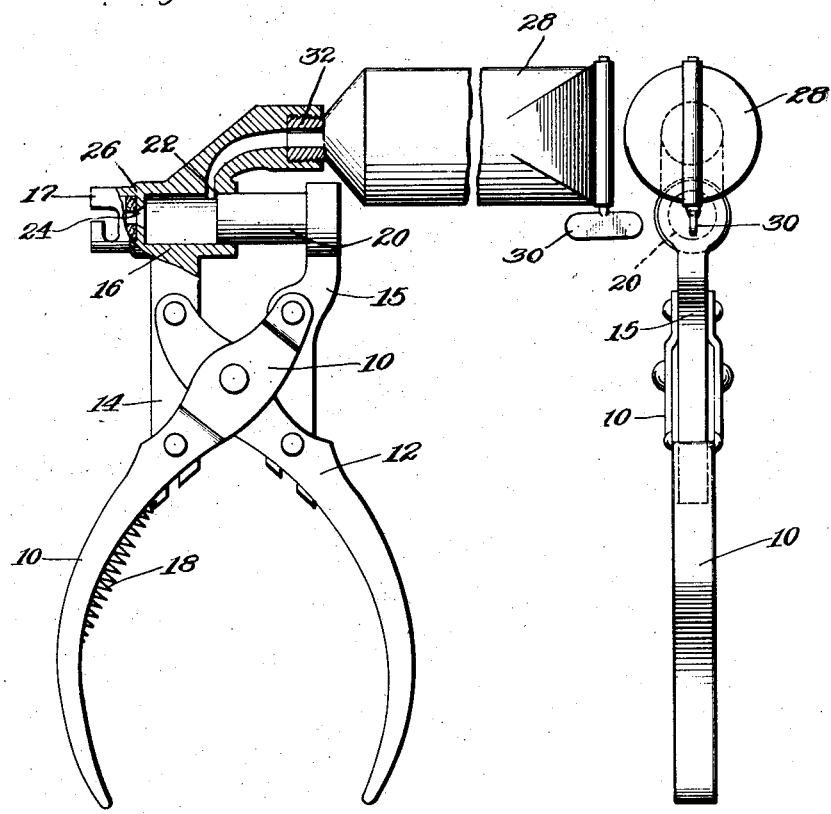
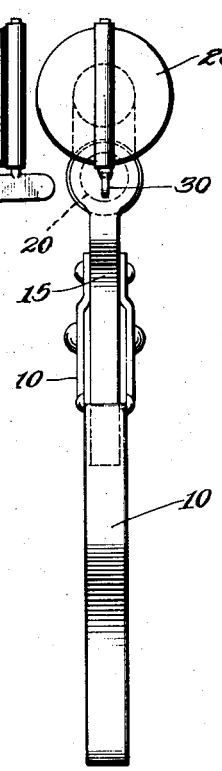
Inventor
John L. Creveling.

Patented June 5, 1928.

1,672,602

UNITED STATES PATENT OFFICE.

JOHN L. CREVELING, OF NEAR TUCSON, PIMA COUNTY, ARIZONA, ASSIGNOR TO THE BASSICK MANUFACTURING COMPANY, OF CHICAGO, ILLINOIS, A CORPORATION OF DELAWARE.

LUBRICATING MEANS.

Original application filed October 11, 1920, Serial No. 416,148. Divided and this application filed January 28, 1925. Serial No. 5,269.

My invention relates to the art of forced lubrication of machine parts, such as the rotary bearings of motor vehicles and other equipment, in which a pressure tight receiving fitting is provided in connection with each bearing or part to be lubricated, to receive and retain lubricant forced into the same. Such systems and the fittings therefor are old and well known in the art and per se form no part of the present invention, which relates to the means employed for forcing the lubricant into the fitting.

Among the primary objects and advantages of the invention may be enumerated.

First. The improvement of the mechanical means for commercializing distribution of lubricant for use in lubricating guns.

Second. Eliminating the possibility of contamination of lubricant with dirt or grit in transfer from the manufacturer to the bearings, especially in that portion of the transfer between the retail dealer and the lubricant gun.

Third. Increasing the liability of a supply of the proper lubricant to each bearing by providing for changing from one lubricant to another with a maximum of convenience, a minimum of waste, and a minimum of intermixture of the different lubricants.

Fourth. Reduction of the sum total of the equipment required for forced lubrication to a minimum of bulk and cost.

Further objects and advantages of the invention will be apparent as the description proceeds.

In the accompanying drawings:

Fig. 1 is a plan view of one type of apparatus according to the invention;

Fig. 2 is a side elevation; and

Fig. 3 is an end elevation of the same parts.

The pivoted levers 10 and 12 are adapted to move the parallel jaws 14 and 15 toward and away from each other, the parts being ordinarily held in the expanded position shown in Fig. 2 by a tension spring 18. This linkage is well known in various uses in other arts.

Jaw 14 carries cylinder 16 integral therewith or permanently attached thereto. Cylinder 16 has the terminal connection 17 built close up to the end of the cylinder. The other parallel jaw 15 carries piston 20 sliding in cylinder 16.

Inlet port 22 will be sealed by piston 20 shortly after the beginning of the stroke after which the contents of cylinder 16 will be forced out into terminal 17 and into any suitable fitting to which the same may be coupled.

It will be observed that when the piston is at the end of its stroke the short connecting passage 24 through partition 26 represents the entire volume of lubricant that will remain in the device in case it is detached from the fitting without withdrawing the piston.

The lubricant reservoir 28 is in the form of a flexible and collapsible metallic tube or bag well known as a container for tooth paste and similar preparations. For convenience in using up the contents with considerable rapidity, it may, if desired be provided with a key 30 to assist in collapsing it by rolling up the flattened end.

The connection to the container may obviously be made at an angle most suitable for facilitating access to the various parts. I have illustrated the container placed substantially behind cylinder 16 where it will be sufficiently spaced from the hand of the operator employed to operate levers 10 and 12.

It will be noted that when a change is to be made from one kind of lubricant to another, piston 20 can be left at the inner end of its stroke, while the device is removed from the fitting, and thereafter reservoir 28 may be unscrewed from the threaded connection at 32 to be replaced by a duplicate container filled with the other kind of lubricant. Such a replacement will deliver to the bearing intended to receive the new lubricant a quantity of the old lubricant represented only by the relative negligible capacity of passageway 24 and port 22.

This application is a division of my copending application, Serial No. 416,148, filed October 11, 1920.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. A forced lubrication equipment, comprising articulated levers to be held in one hand and collapsed thereby, lubricant injecting means actuated by said levers, and a collapsible tube lubricant container detachably connected to said injecting means and extending back at right angles to the general direction of said levers.

2. A forced lubrication equipment, comprising articulated levers to be held in one hand and collapsed thereby, lubricant injecting means actuated by said levers, and a collapsible tube lubricant container detachably connected to said injecting means, said container extending laterally with respect to said levers, and said injecting means having a coupling terminal opening laterally in the opposite direction.

In witness whereof, I hereunto subscribe my name this 15 day of January, 1925.

JOHN L. CREVELING.